(12) United States Patent
Matsumoto

(10) Patent No.: US 9,067,567 B2
(45) Date of Patent: Jun. 30, 2015

(54) VEHICLE WIPER APPARATUS

(75) Inventor: Yasuhiro Matsumoto, Hamamatsu (JP)

(73) Assignee: Asmo Co., Ltd., Shizuoka-ken (JP)

( * ) Notice: Subject to any disclaimer, the term of this patent is extended or adjusted under 35 U.S.C. 154(b) by 219 days.

(21) Appl. No.: 13/820,068

(22) PCT Filed: Apr. 19, 2012

(86) PCT No.: PCT/JP2012/060540
§ 371 (c)(1),
(2), (4) Date: Feb. 28, 2013

(87) PCT Pub. No.: WO2012/144547
PCT Pub. Date: Oct. 26, 2012

(65) Prior Publication Data
US 2013/0152320 A1    Jun. 20, 2013

(30) Foreign Application Priority Data

Apr. 20, 2011  (JP) ................................. 2011-094085

(51) Int. Cl.
| | |
|---|---|
| B60S 1/46 | (2006.01) |
| B60S 1/32 | (2006.01) |
| B60S 1/38 | (2006.01) |
| B60S 1/48 | (2006.01) |
| B60S 1/52 | (2006.01) |

(52) U.S. Cl.
CPC ................. B60S 1/32 (2013.01); B60S 1/3801 (2013.01); B60S 1/486 (2013.01); B60S 1/522 (2013.01); B60S 1/524 (2013.01); B60S 2001/3815 (2013.01)

(58) Field of Classification Search
CPC ................................. B60S 1/522; B60S 1/524
USPC .......... 15/250.02, 250.03, 250.04; 239/284.1, 239/284.2
See application file for complete search history.

(56) References Cited

U.S. PATENT DOCUMENTS

| | | | | | |
|---|---|---|---|---|---|
| 3,017,650 | A | * | 1/1962 | Schaal ........................ | 15/250.02 |
| 3,428,992 | A | * | 2/1969 | Di Giorgio ................. | 15/250.04 |
| 3,562,839 | A | * | 2/1971 | Riester ....................... | 15/250.02 |
| 3,793,670 | A | * | 2/1974 | Riester et al. .............. | 15/250.04 |
| 4,133,071 | A | * | 1/1979 | Jaske .......................... | 15/250.04 |
| 4,782,547 | A | * | 11/1988 | Mohnach ................... | 15/250.04 |
| 4,969,227 | A | * | 11/1990 | Reed et al. ................. | 15/250.14 |

(Continued)

FOREIGN PATENT DOCUMENTS

| | | |
|---|---|---|
| JP | 50-104333 | 8/1975 |
| JP | 2002-536244 A | 10/2002 |

(Continued)

*Primary Examiner* — Monica Carter
*Assistant Examiner* — Michael Jennings
(74) *Attorney, Agent, or Firm* — Christensen Fonder P.A.

(57) ABSTRACT

A vehicle wiper apparatus is applied to a vehicle provided with a wiping surface including a first wiping area at a passenger's seat side and a second wiping area at a driver's seat side. A first wiper includes a first wiper blade configured to wipe the first wiping area. A second wiper includes a second wiper blade configured to wipe the second wiping area. A washer nozzle is arranged on the first wiper to supply washing liquid to the second wiping area. The washer nozzle sprays washing liquid so that the supply of washing liquid toward a front side in an advancing direction of the second wiper blade switches to a rear side in the advancing direction when the second wiper blade moves from the first reversing position to the second reversing position during the wiping operation of the first and second wipers.

10 Claims, 11 Drawing Sheets

(56) References Cited

U.S. PATENT DOCUMENTS

| | | | | |
|---|---|---|---|---|
| 5,327,613 | A | * | 7/1994 | Ohtsu .................... 15/250.02 |
| 5,363,531 | A | * | 11/1994 | Chevrier et al. .......... 15/250.04 |
| 5,632,058 | A | * | 5/1997 | Stanak ..................... 15/250.04 |
| 5,724,699 | A | * | 3/1998 | Bexten ..................... 15/250.04 |
| 5,819,360 | A | * | 10/1998 | Fujii ........................ 15/250.04 |
| 5,944,910 | A | * | 8/1999 | Fujii ................................. 134/6 |
| 5,946,763 | A | * | 9/1999 | Egner-Walter et al. .... 15/250.02 |
| 6,442,788 | B1 | * | 9/2002 | Fleischer ................... 15/250.04 |
| 6,536,069 | B1 | * | 3/2003 | Neag et al. ................ 15/250.14 |
| 6,615,438 | B1 | * | 9/2003 | Franco et al. ............. 15/250.02 |
| 7,171,716 | B2 | * | 2/2007 | Franco et al. ............. 15/250.05 |
| 7,793,381 | B2 | * | 9/2010 | Yon .......................... 15/250.04 |
| 7,836,541 | B2 | * | 11/2010 | Harita et al. .............. 15/250.04 |
| 8,028,367 | B2 | * | 10/2011 | Makihara et al. .......... 15/250.04 |
| 8,069,527 | B2 | | 12/2011 | Harita |
| 2006/0282971 | A1 | * | 12/2006 | Makihara et al. .......... 15/250.04 |
| 2007/0089257 | A1 | * | 4/2007 | Harita et al. .............. 15/250.04 |
| 2007/0143947 | A1 | * | 6/2007 | Harita et al. .............. 15/250.04 |
| 2008/0060677 | A1 | * | 3/2008 | Nakano ............................. 134/6 |
| 2008/0127441 | A1 | * | 6/2008 | Inoue ....................... 15/250.04 |
| 2010/0101604 | A1 | * | 4/2010 | Fonville et al. ................... 134/6 |

FOREIGN PATENT DOCUMENTS

| | | |
|---|---|---|
| JP | 2003-048517 A | 2/2003 |
| JP | 2006-347302 A | 12/2006 |
| JP | 2008-162328 A | 7/2008 |
| JP | 4819703 B2 | 9/2011 |
| JP | 2012-158263 A | 8/2012 |

* cited by examiner

VEHICLE WIPER APPARATUS

RELATED APPLICATIONS

The present application is a National Phase entry of PCT Application No. PCT/JP2012/060540, filed Apr. 19, 2012, which claims priority from Japanese Patent Application Number 2011-094085, filed Apr. 20, 2011, the disclosures of which are hereby incorporated by reference herein in their entirety.

FIELD OF THE INVENTION

The present invention relates to a vehicle wiper apparatus including a means for wiping a wiping surface of a window glass and supplying washing liquid to the wiping surface.

BACKGROUND OF THE INVENTION

In the prior art, a vehicle wiper apparatus includes a wiper arm, which is pivoted back and forth, and a wiper blade, which is coupled to a distal portion of the wiper arm to wipe the wiping surface of the window glass. In this type of vehicle wiper apparatus, a washer nozzle that ejects and supplies washing liquid on the wiping surface may be arranged on the engine hood or on a lower surface of the rear end of the engine hood. In such a structure, however, when travelling at a high speed, the ejecting trajectory and the landing point of washing liquid are easily affected by the wind and thereby lower the landing point of the liquid. Further, washing liquid is ejected and supplied over the wiper arm and the wiper blade. Thus, the wiper arm may interfere with washing liquid and scatter washing liquid. Thus, it is difficult to supply washing liquid to an appropriate position.

To solve such a problem, patent document 1 describes an example of a vehicle wiper apparatus that arranges the washer nozzle on the wiper blade so that washing liquid can be supplied to the wiping surface from a close range. This suppresses the influence of wind on washing liquid ejected from the washer nozzle. This ensures that washing liquid is supplied to the wiping surface.

PRIOR ART DOCUMENT

Patent Documents

Patent Document 1: Japanese Laid-Open Patent Publication No. 2008-162328
Patent Document 2: Japanese Laid-Open Utility Model Publication No. 50-104333

SUMMARY OF THE INVENTION

A typical vehicle wiper apparatus includes two wipers (wiper arm and wiper blade), of which one to wipe an area at the driver's seat side of the wiping surface and another to wipe an area at the passenger's seat side of the wiping surface. Thus, the washer nozzle is arranged on each wiper blade to supply washing liquid to the corresponding washing area. Such a structure, however, requires the task of attaching the washer nozzle to each wiper blade as well as the task of arranging and fixing a hose to each wiper arm that is coupled with the washer nozzle.

Since the washer nozzle is arranged on each wiper that is pivoted back and forth, washing liquid can be supplied prior to wiping by the wiper blade and immediately wiped during one of the forward motion or backward motion of the wiper blade. On the contrary, washing liquid may remain without being wiped for a relatively long time during the other one of the forward motion or backward motion of the wiper blade even at the driver's seat side. To solve such a problem, patent document 2 describes an example of a window washer including a control circuit that performs ejecting control to detect the wiping position and direction of the wiper to constantly supply washing liquid at the front side relative to the wiping direction. However, the device is expensive.

It is an object of the present invention to provide a vehicle wiper apparatus that effectively supplies washing liquid with an inexpensive structure while facilitating manufacturing.

To achieve the above object, one aspect of the present invention is a vehicle wiper apparatus applied to a vehicle provided with a wiping surface including a first wiping area at a passenger's seat side and a second wiping area at a driver's seat side. The vehicle wiper apparatus is provided with a first wiper including a first wiper arm, which is configured to pivot back and forth, and a first wiper blade, which is coupled to a distal portion of the first wiper arm and configured to wipe the first wiping area. A second wiper includes a second wiper arm, which is configured to pivot back and forth, and a second wiper blade, which is coupled to a distal portion of the second wiper arm and configured to move back and forth between a first reversing position and a second reversing position to wipe the second wiping area. A washer nozzle is arranged on the first wiper to supply washing liquid to the second wiping area. The washer nozzle is configured to spray washing liquid so that the supply of washing liquid toward a front side in an advancing direction of the second wiper blade switches to a rear side in the advancing direction when the second wiper blade moves from the first reversing position to the second reversing position during the wiping operation of the first and second wipers.

DETAILED DESCRIPTION OF THE PREFERRED EMBODIMENTS

One embodiment of the present invention will now be described with reference to the drawings.

Figure 1:
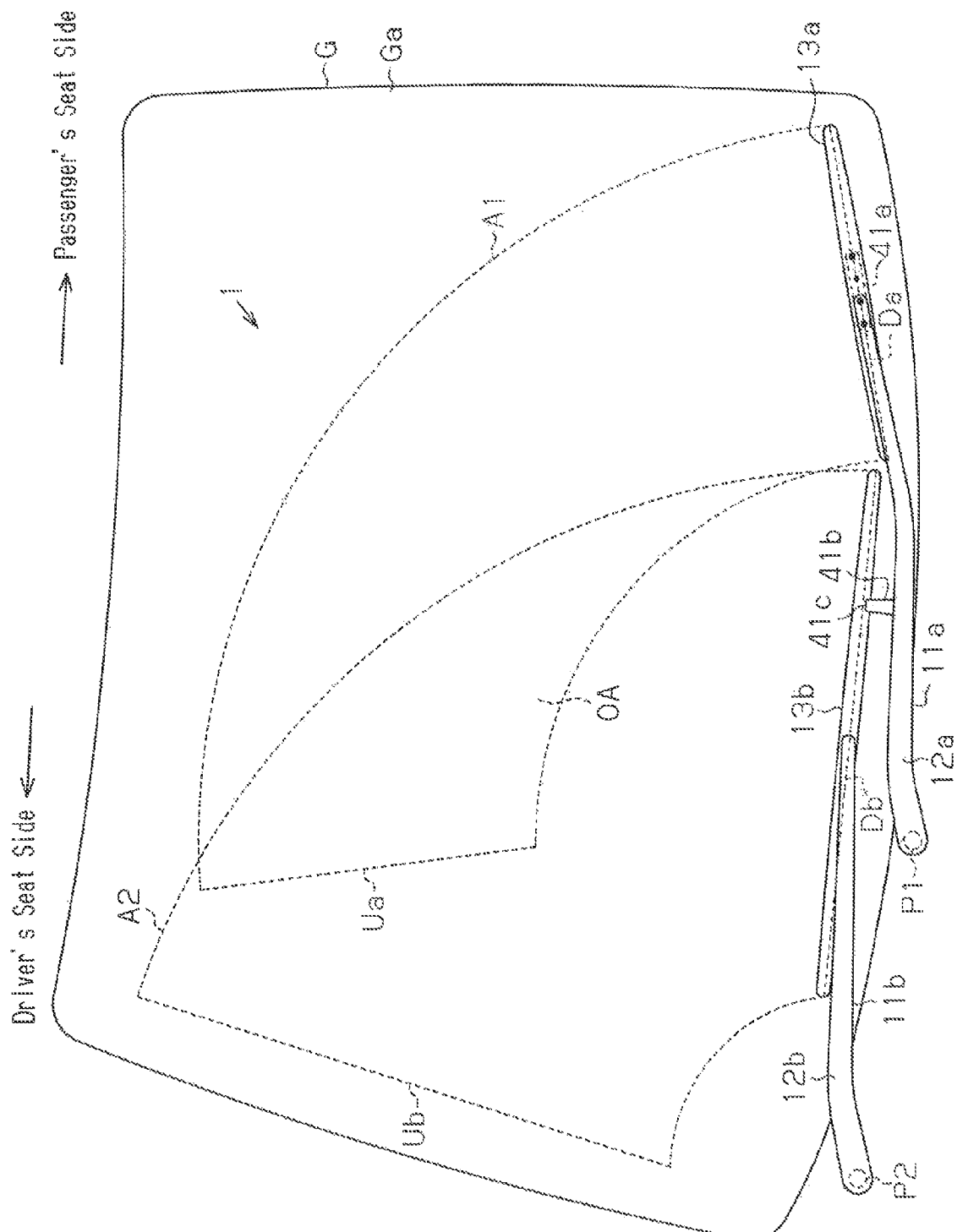
FIG. 1 is a schematic diagram showing a vehicle wiper apparatus according to one embodiment of the present invention.

As shown in FIG. 1, a vehicle wiper apparatus 1 of the present embodiment wipes a wiping surface Ga, which is a surface of a window glass G of the vehicle located at an outer side of a passenger compartment. The vehicle wiper apparatus 1 includes two wipers, a passenger's seat side wiper 11a and a driver's seat side wiper 11b. The passenger's seat side wiper 11a wipes an area (first wiping area A1) at the passenger's seat side of the wiping surface Ga of the window glass G of an automobile, and the driver's seat side wiper 11b wipes an area (second wiping area A2) at the driver's seat side of the wiping surface Ga.

The passenger's seat side wiper 11a includes a wiper arm 12a and a wiper blade 13a, and the driver's seat side wiper 11b includes a wiper arm 12b and a wiper blade 13b. The wiper arms 12a and 12b of the wipers 11a and 11b include basal portions fixed to pivot shafts P1 and P2, which are pivoted back and forth by a predetermined angle by driving forces of wiper motors (not shown), and distal portions, to which the wiper blades 13a and 13b are pivotally coupled, respectively.

Each of the pivot shafts P1 and P2 is pivotally supported by a pivot holder (not shown) arranged in a windshield panel (not shown) and the like at the lower part of the window glass G. The pivot shaft P1 of the passenger's seat side wiper 11a is arranged at a position slightly toward the driver's seat side from a middle part in a width direction of the window glass G, and the pivot shaft P2 of the driver's seat side wiper 11b is arranged near a lower end of the window glass G at the driver's seat side in the width direction. A spring (not shown) that pushes each wiper blade 13a and 13b against the wiping surface Ga is attached to each of the wiper arms 12a and 12b. The pivot shafts P1 and P2 are cooperatively operated synchronously and pivoted back and forth in the same direction by a link mechanism or the like (not shown). This synchronously pivots the wiper arms 12a and 12b back and forth in the same direction. In this manner, the wiper blades 13a and 13b perform a wiping operation on the wiping surface Ga.

In the vehicle wiper apparatus 1 of the present embodiment, two washer nozzles 41a and 41b are arranged only on the passenger's seat side wiper 11a of the two wipers 11a and 11b. Specifically describing, the passenger's seat side washer nozzle 41a is arranged on the wiper blade 13a, and the driver's seat side washer nozzle 41b is arranged on the wiper arm 12a.

Figure 2:
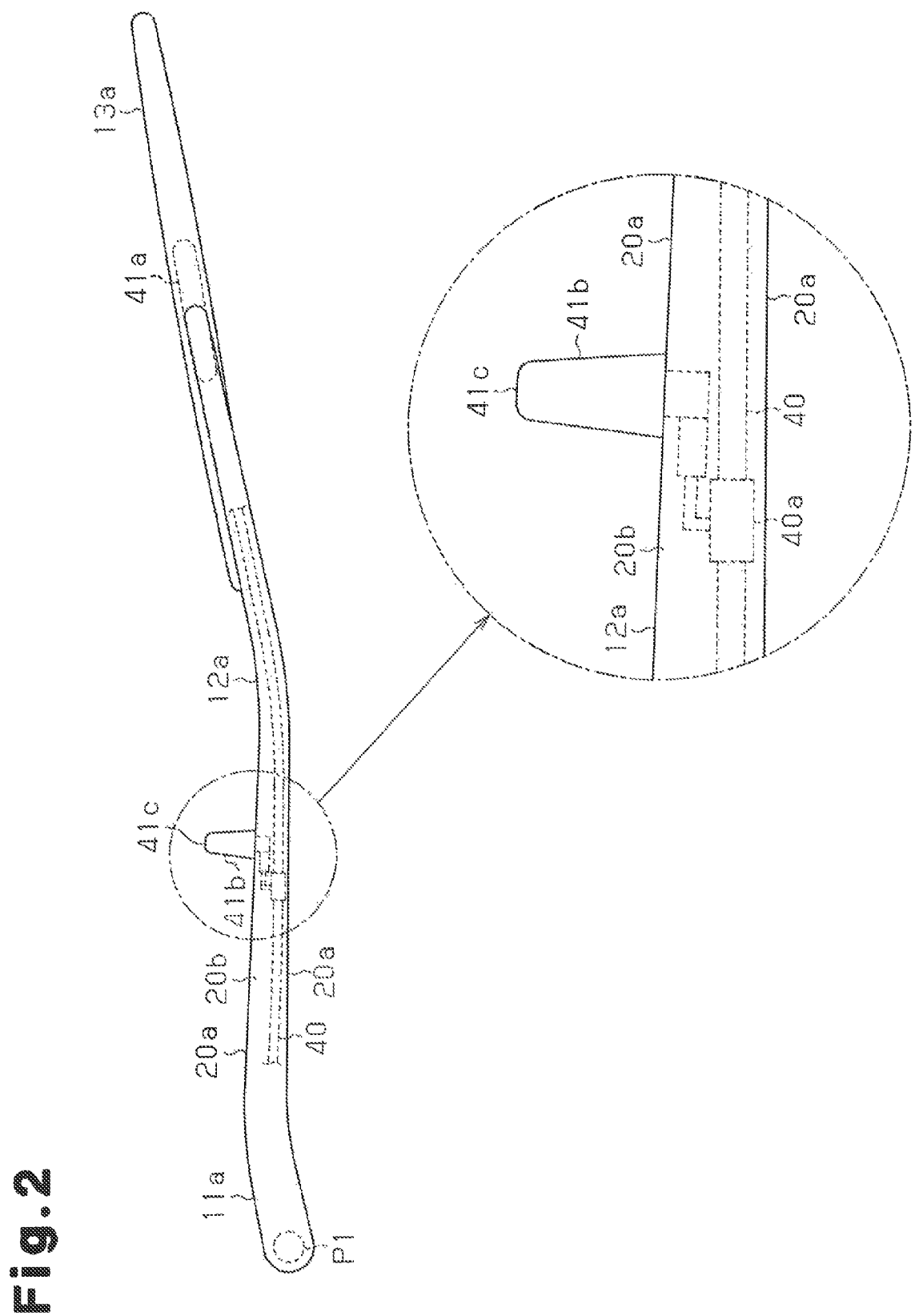
FIG. 2 is a schematic diagram showing a passenger's seat side wiper of FIG. 1.
Figure 3:
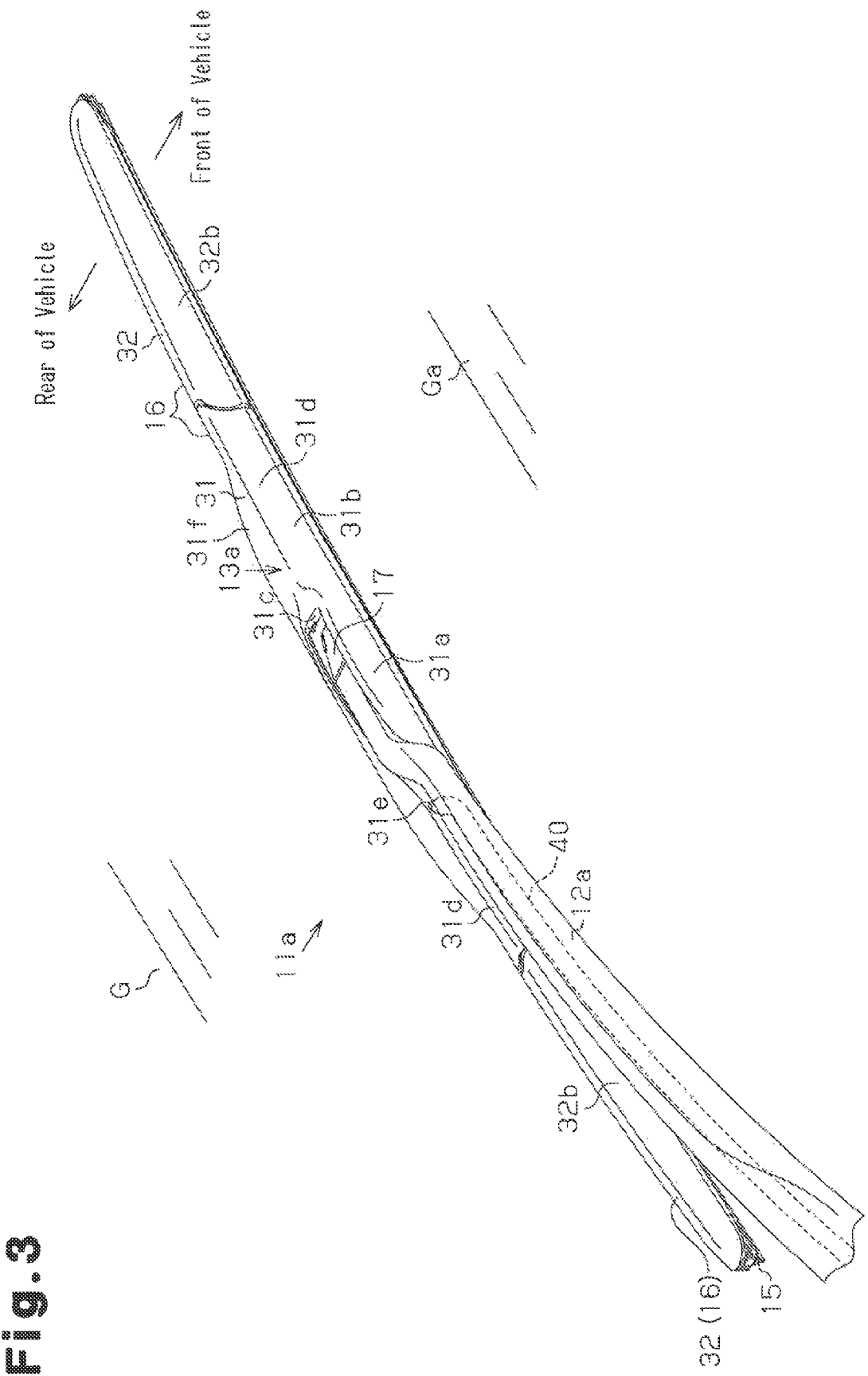
FIG. 3 is a perspective view showing the passenger's seat side wiper of FIG. 1.

As shown in FIGS. 2 and 3, a hose 40 for supplying washing liquid to the washer nozzle 41a is arranged in the wiper arm 12a of the passenger's seat side wiper 11a. The driver's seat side wiper 11b has a structure substantially similar to the structure excluding the washer nozzles 41a and 41b and components of the washer nozzles 41a and 41b such as the hose 40 and the like from the passenger's seat side wiper 11a. Therefore, the passenger's seat side wiper 11a will be hereinafter described in detail, and the driver's seat side wiper 11b will not be described in detail.

Figure 8:
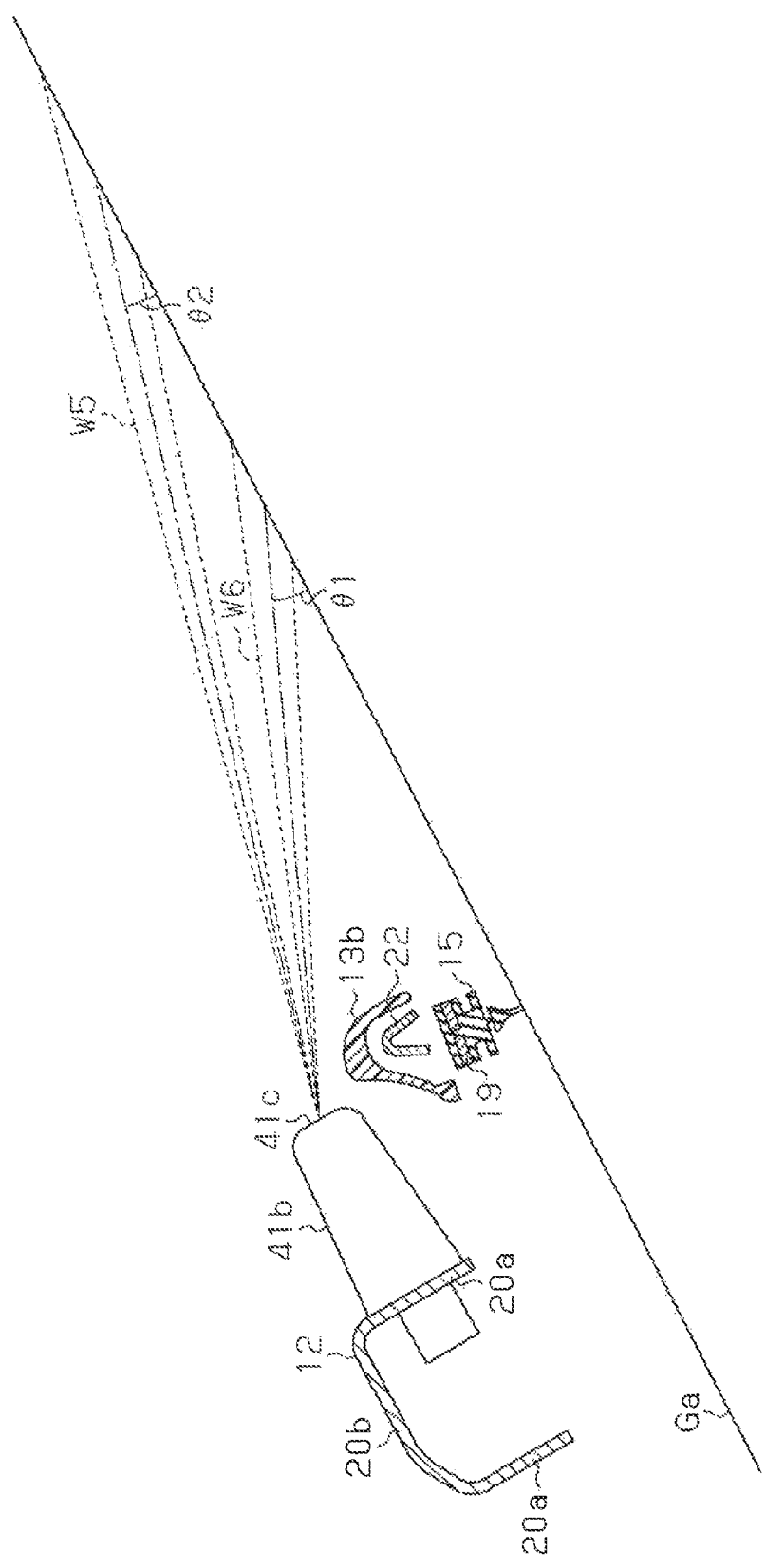
FIG. 8 is a cross-sectional view schematically showing a spray mode of a driver's seat side washer nozzle when the wiper of FIG. 1 is at a stop position.

As shown in FIGS. 2 and 8, the wiper arm 12a is made from a metal plate material, has a channel-shaped cross-section that opens toward the wiping surface Ga, and includes two side walls 20a facing each other in a pivoting direction (advancing direction) and an upper wall 20b that connects the upper end (non-wiping surface side end) of each side wall 20a. The wiper arm 12a extends in a slightly curved manner from the basal portion fixed to the pivot shaft P1 toward the distal portion, and the wiper blade 13a is pivotally coupled at the distal portion.

The driver's seat side washer nozzle 41b is arranged at an intermediate portion in a longitudinal direction of the wiper arm 12a. The washer nozzle 41b is fixed to the side wall 20a.

As shown in FIGS. 1 and 8, the washer nozzle 41b projects toward the advancing direction from the side wall 20a in a state in which the wipers 11a and 11b are at a stop position (lower reversing position Da, Db serving as first reversing position). A distal portion 41c of the washer nozzle 41b extends to the upper side (non-wiping surface side) of the wiper blade 13b of the driver's seat side wiper 11b. Specifically, the distal portion 41c overlaps, in a direction orthogonal to the wiping surface Ga, with a portion of the wiper blade 13b on the distal portion side than the longitudinally middle part of the wiper blade 13b.

The distal portion 41c of the washer nozzle 41b includes two ejection holes (not shown) that respectively eject washing liquids W5 and W6. A jet nozzle capable of ejecting the washing liquids W5 and W6 as ejection flows having directivity from the ejection holes is used for the washer nozzle 41b. The washer nozzle 41a is set such that the ejecting direction and distance to the landing points of the ejected the washing liquids W5 and W6 are different from each other. The distance to the landing point is farther for the washing liquid W5 compared to the washing liquid W6, and the ejecting direction of the washing liquid W5 is set in a direction tilted toward the distal portion side of the passenger's seat side wiper 11a with respect to a direction in which the washer nozzle 41b projects. The distance to the landing point is shorter for the washing liquid W6 compared to the washing liquid W5, and the ejecting direction of the washing liquid W6 is set in a direction tilted toward the basal side of the passenger's seat side wiper 11a with respect to a direction in which the washer nozzle 41b projects.

As shown in FIG. 2, the hose 40 extending from a washer pump (not shown) on a vehicle body side is arranged on an inner side of the wiper arm 12a. The hose 40 is made from a resin material, an elastic material such as rubber, elastomer, and the like. A Y-joint 40a is arranged at an intermediate portion of the hose 40, so that washing liquid fed from the vehicle body side is divided to the driver's seat side washer nozzle 41b and the passenger's seat side washer nozzle 41a by the Y-joint 40a, and supplied to the respective nozzles 41a and 41b.

As shown in FIGS. 4(a) to 4(c) and FIG. 5, the wiper blade 13a includes a lever assembly 14, a blade rubber 15, a cover member 16, a coupling member 17, and an attachment plate 18.

The lever assembly 14 includes three levers, namely, a primary lever 21 and two secondary levers 22 that are pivotally coupled to longitudinal ends of the primary lever 21.

The primary lever 21 includes a holder 21a, which is located at the central part in the longitudinal direction, and arms 21b, which extend from two sides of the holder 21a. The holder 21a has two parallel flat side walls and includes a rectangular opening 21c by the upper parts of the side walls. The distal portion of the wiper arm 12a is inserted into the opening 21c. The coupling member 17 is pivotally coupled to the holder 21a, and the distal portion of the wiper arm 12a is attached in a removable manner to the coupling member 17. The arm 21b has a ridge-shaped cross-section (substantially U-shaped cross-section having at opening facing the wiping surface Ga) taken in a direction orthogonal to the longitudinal direction.

The secondary lever 22 has a ridge-shaped cross-section (substantially U-shaped cross-section having an opening facing the wiping surface Ga) in the same manner as the arm 21b of the primary lever 21. Each secondary lever 22 has a longitudinally central part pivotally coupled to one of the ends (distal portion of each arm 21b) of the primary lever 21. A retaining portion 22a for retaining (holding) the blade rubber 15 is formed at each end in the longitudinal direction of each secondary lever 22. The retaining portion 22a is substantially channel-shaped and has an opening facing the wiping surface Ga as viewed from the longitudinal direction. The ends at the opening extend inward so as to narrow the width. The four elongated retaining portions 22a retain the blade rubber 15, which is formed a rubber member, and contact the wiping surface Ga to wipe the wiping surface Ga, at predetermined intervals in the longitudinal direction, as shown in FIG. 4.

Two elongated backings 19, which disperse the pressing force toward the wiping surface Ga received from the retaining portion 22a in the longitudinal direction, are attached to the blade rubber 15 along the longitudinal direction of the rubber 15. The backing 19 is divided in the longitudinal direction into sections having different curvatures and has an overall curved shape. The curvature in each section of the backing 19 is set in conformance with the curved surface shape of the wiping surface Ga so that the blade rubber 15 attached to the backing 19 conforms to the entire wiping range of the wiping surface Ga in a satisfactory manner.

Figure 4A:
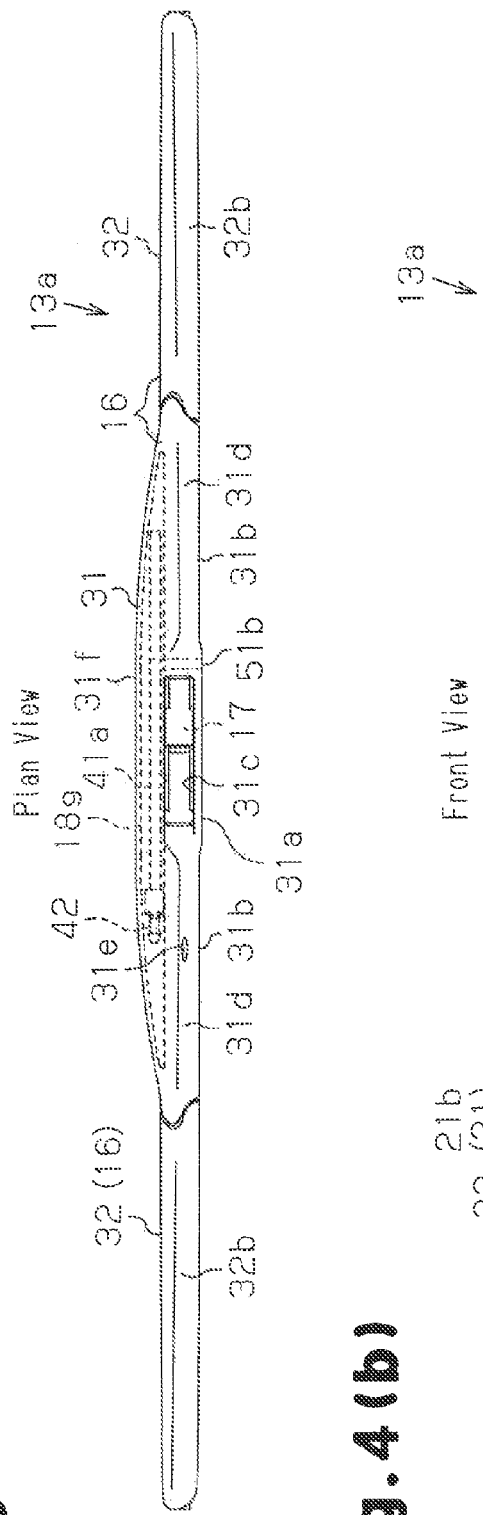
FIG. 4(a) is a plan view of a wiper blade of FIG. 1.
Figure 4B:
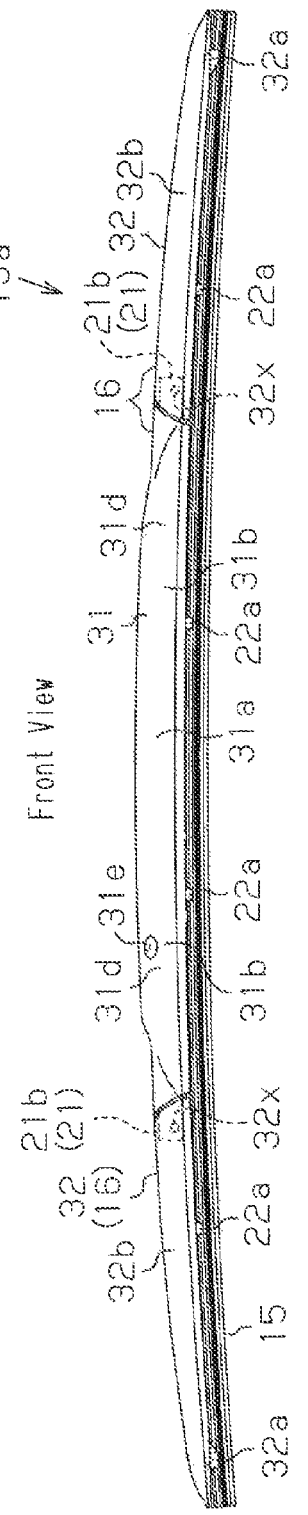
FIG. 4(b) is a front view of the wiper blade of FIG. 1.
Figure 4C:
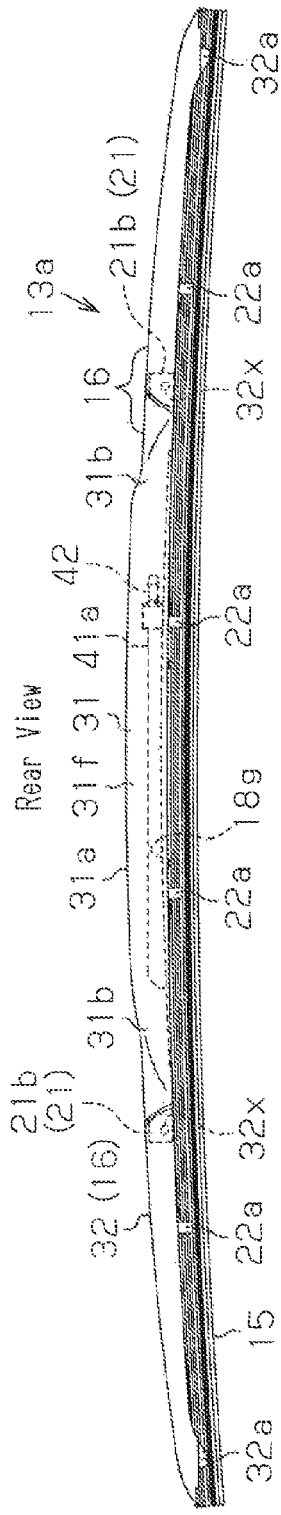
FIG. 4(c) is a rear view of the wiper blade of FIG. 1.
Figure 5:
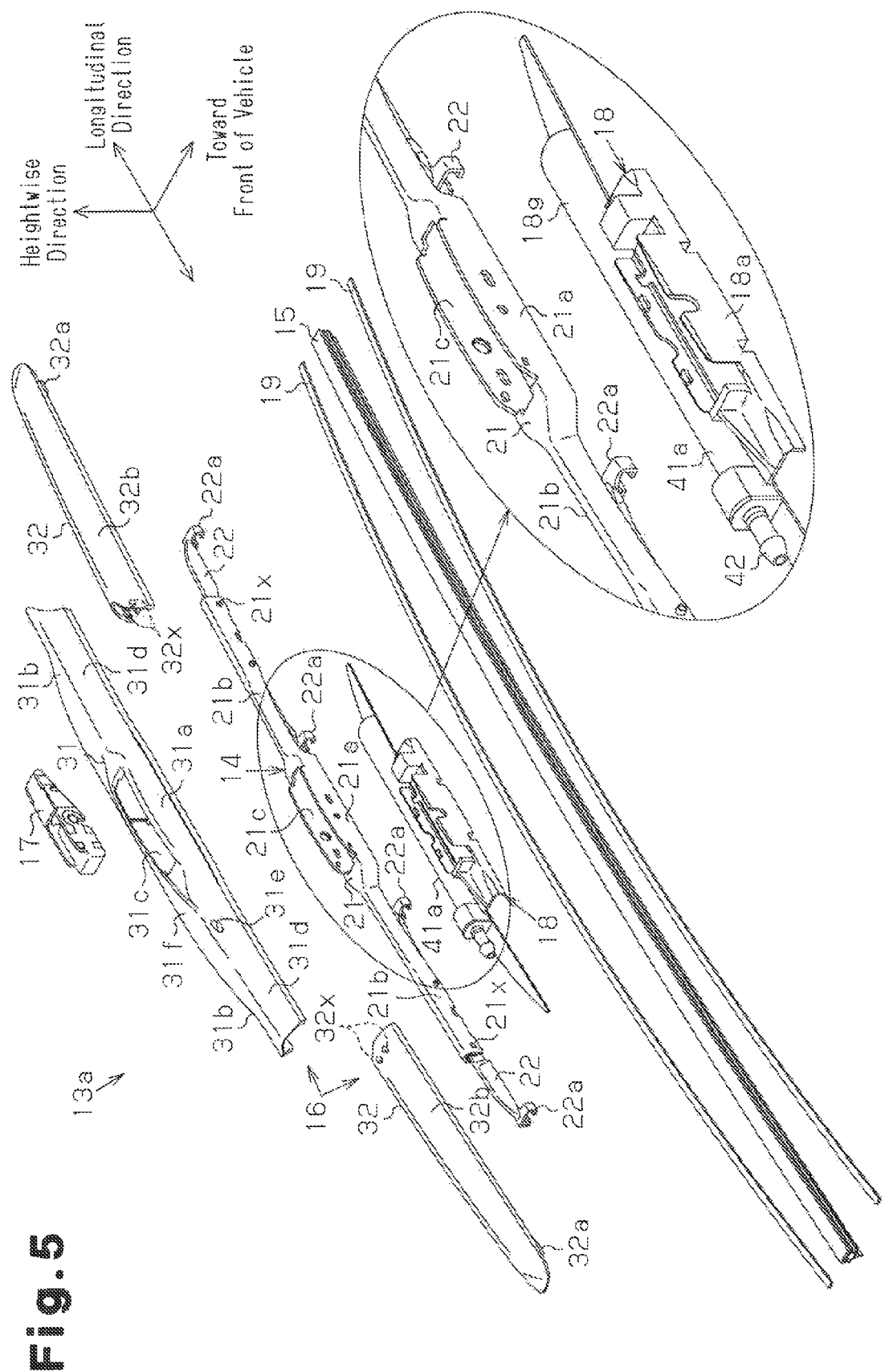
FIG. 5 is an exploded perspective view of the wiper blade of FIG. 1.

As shown in FIGS. 3 to 5, the cover member 16 that covers the lever assembly 14 is arranged to extend to both ends of the blade rubber 15. The cover member 16 includes a center cover 31, which is formed with a predetermined rigidity by a resin material, and two side covers 32, which are arranged on two sides of the center cover 31.

The center cover 31 is attached to the primary lever 21 to substantially cover the entire lever 21. The center cover 31 includes a holder accommodating portion 31a, at a central part in the longitudinal direction, and an arm accommodating portion 31b, which extends in the longitudinal direction from two sides of the holder accommodating portion 31a. The center cover 31 has a nozzle accommodating portion 31f in which the washer nozzle 41a arranged on the attachment plate 18, which will be described later, is accommodated. The holder accommodating portion 31a accommodates the holder 21a of the primary lever 21 and includes, at an upper part, an opening 31c corresponding to the opening 21c provided in the holder 21a. The distal portion of the wiper arm 12a is fitted to the opening 31c. The arm accommodating portion 31b has a ridge-shaped cross-section (substantially U-shaped cross-section having an opening facing the wiping surface Ga) in a direction orthogonal to the longitudinal direction. The nozzle accommodating portion 31f is arranged on a side (wiping start advancing direction side of the wiper blade 13a) opposite to a fin portion 31d, which will be described later, next to the holder accommodating portion 31a. As shown in FIG. 4(a), the nozzle accommodating portion 31f is formed to bulge out so that the internal space enlarges to have a substantially streamline form in the width direction.

The basal portion of the side cover 32 is pivotally coupled to each end of the primary lever 21 (distal portion of the arm 21b). In this case, a coupling pin 32x is arranged on the inner side of the basal portion of the side cover 32, and a fitting hole 21x, into which the coupling pin 32x is fitted, is formed at each end of the primary lever 21 so that the side cover 32 can be pivoted by the coupling pin 32x fitted to the fitting hole 21x. In the same manner as the arm accommodating portion 31b of the center cover 31, the side cover 32 has a ridge-shaped cross section (substantially U-shaped cross-section having an opening facing the wiping surface Ga) and is formed such that the height of the top part gradually becomes lower from the basal portion toward the distal portion. The side cover 32 covers the secondary levers 22 projecting from two ends of the primary lever 21 and is arranged at the upper part of the blade rubber 15 on the further distal portion side of the secondary lever 22. A retaining portion 32a having a shape similar to the retaining portion 22a of the secondary lever 22 is formed at the distal portion of the side cover 32 to retain (hold) the end of the blade rubber 15. The side cover 32 pivots with the basal portion (coupling pin 32x) attached to two ends of the primary lever 21 as the center so as to follow the deformation of the blade rubber 15 projecting in the longitudinal direction from the end of each secondary lever 22.

On the arm accommodating portion 31b of the center cover 31 and the wall on the front side of the vehicle in each side cover 32, the fin portions 31d and 32b are respectively formed to generate a pressing force for pressing the blade rubber 15 against the wiping surface Ga when subjected to wind that is produced when the vehicle travels. The fin portions 31d and 32b are arranged over the entire longitudinal direction of the arm accommodating portion 31b and the side cover 32.

Figure 6:
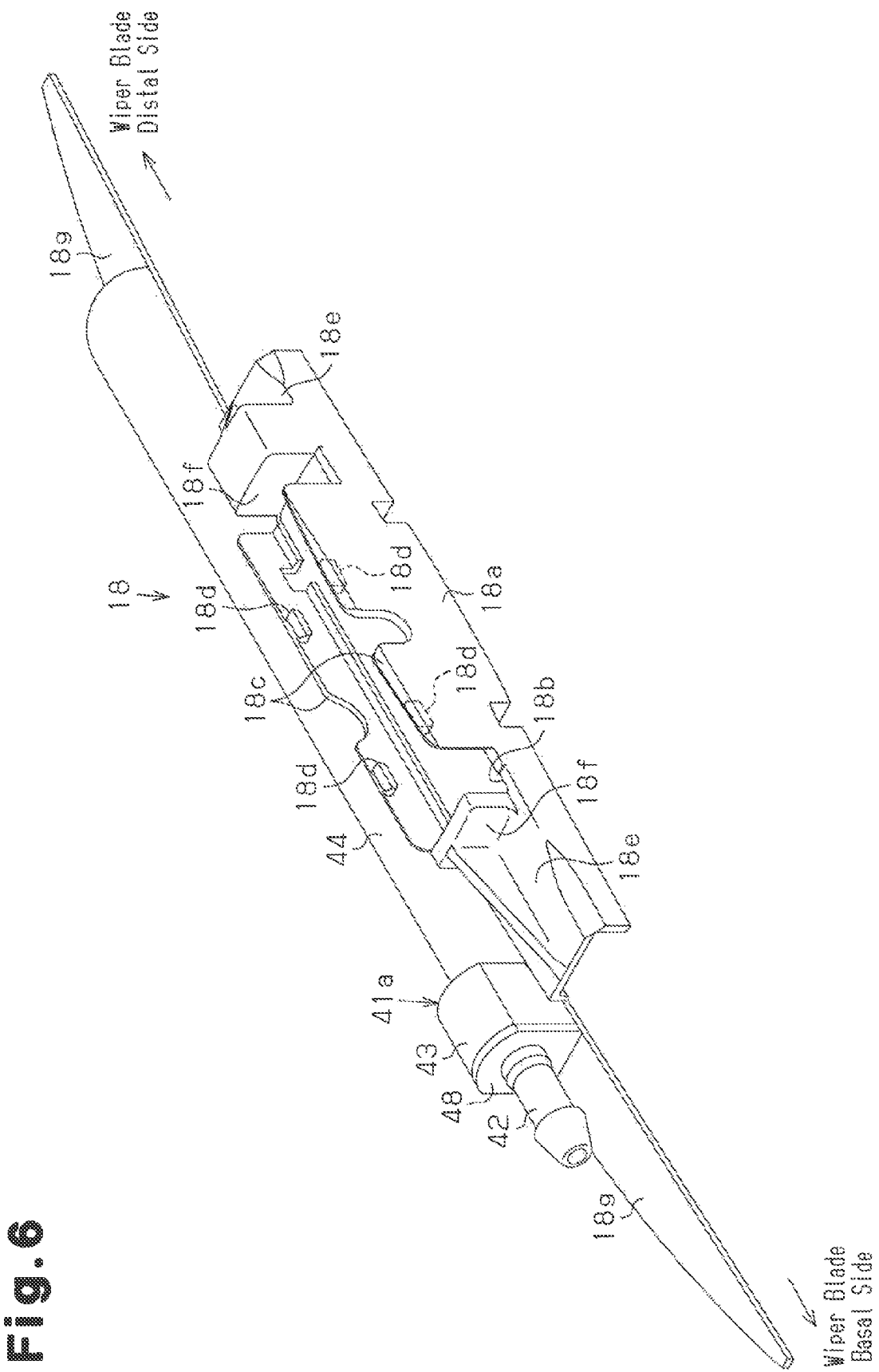
FIG. 6 is a perspective view of an attachment plate including the washer nozzle of FIG. 5.

As shown in FIGS. 4(a) and 4(c), the washer nozzle 41a is arranged in the nozzle accommodating portion 31f, which bulges outward toward the side opposite to (rear side of the vehicle, that is, the wiping start advancing direction side at the stop position of the wiper blade 13a) the side including the fin portion 31d next to the holder accommodating portion 31a in the center cover 31. The washer nozzle 41a is formed integrally with the attachment plate 18 made of resin, as shown in FIG. 6, and attached to the holder 21a of the primary lever 21 from the lower side.

A plate main body 18a of the attachment plate 18 includes a rectangular opening 18b corresponding to the opening 21c of the holder 21a at the central part in the longitudinal direction. An attachment piece 18c, which extends upward along the outer side surface of each side wall of the holder 21a, is formed on each of two widthwise ends of the opening 18b, and two hooking projections 18d, which are hooked to the upper end of the holder 21a, is formed on the inner side of each attachment piece 18c. The attachment plate 18 is thus attached in a removable manner to the holder 21a.

A closing portion 18e for closing the opening on the lower side of the holder 21a is arranged on two longitudinal sides of the opening 18b. A partition wall 18f fitted into the holder 21a is arranged on the upper surface of each closing portion 18e. The partition wall 18f partitions the internal space of the holder 21a into an internal space at the side of the opening 21c and an internal space at the outer side of the opening 21c in the longitudinal direction (side of the arm 21b). That is, when the vehicle is travelling, the arrangement of the closing portion 18e prevents an airflow from entering the opening at the lower side of the holder 21a at both longitudinal sides of the opening 21c, and the arrangement of the partition wall 18f prevents the airflow that enters the opening 21c from entering the longitudinally outer side (side of the arm 21b). The airflow of the primary lever 21 portion having the holder 21a as the center thus becomes smooth, and the wind sound is reduced when the vehicle is travelling.

A lid portion 18g extends from one side of the plate main body 18a (side opposite to the side arranged with the fin portion 31d). The lid portion 18g closes the gap between the primary lever 21 and the center cover 31. The lid portion 18g also prevents airflow from entering the gap between the primary lever 21 and the center cover 31 and reduces wind sound when the vehicle is travelling.

The washer nozzle 41a is formed integrally with the upper surface of the lid portion 18g. In other words, the opening (gap) of the nozzle accommodating portion 31f in the center cover 31 is closed by the lid portion 18g and accommodates the washer nozzle 41. The washer nozzle 41a includes a hose connecting portion 42, a check valve portion 43, and a nozzle portion 44.

Figure 7:
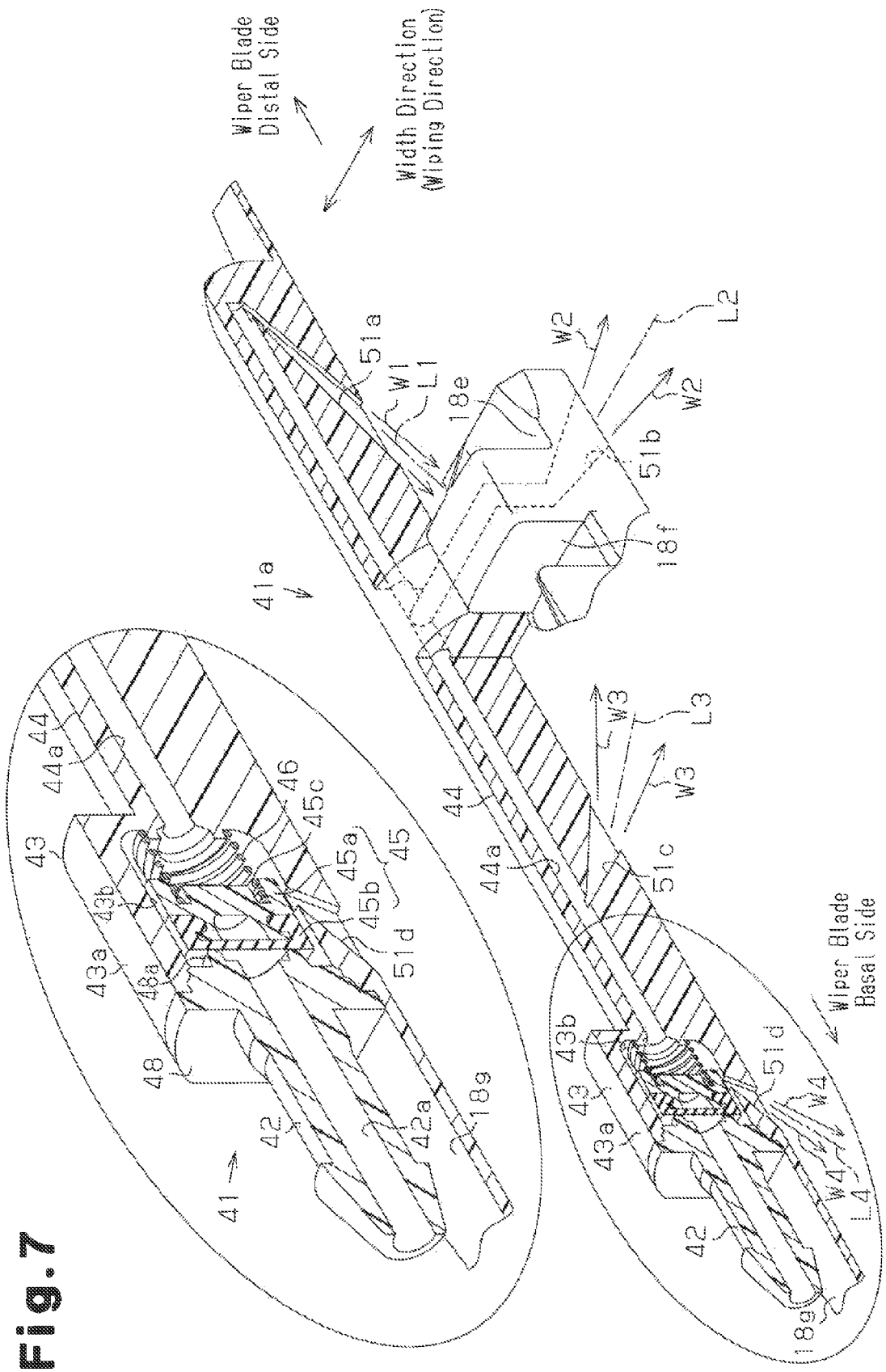
FIG. 7 is a cross-sectional perspective view of the washer nozzle of FIG. 5.

As shown in FIG. 7, a case 43a of the check valve portion 43, which is cylindrical and has a closed bottom end, is formed integrally with the upper surface of the lid portion 18g. The nozzle portion 44, which includes the upper surface of the lid portion 18g and which extends along the longitudinal direction, is formed integrally with the bottom end of the case 43a. An accommodation recess 43b having a circular cross-section is formed inside the case 43a, and a valve body 45 and a coil spring 46 are accommodated in the accommodation recess 43b.

The valve body 45 includes a cylindrical base 45a formed from resin and a disk-shaped seal 45b formed by an elastic member of rubber or an elastomer. The seal 45b is attached to one axial end of the base 45a. A spring attachment groove 45c having an annular shape is formed at the other axial end of the base 45a. One end of the coil spring 46 is attached to the attachment groove 45c. The coil spring 46 is arranged between the valve body 45 and the bottom of the case 43a. The valve body 45 (base 45a and the seal 45b) is set such that the outer diameter is smaller than the inner diameter of the accommodation recess 43b. That is, the valve body 45 is accommodated in the accommodation recess 43b to form a gap with the inner wall surface, and the surrounding of the valve body 45 forms a flow path of washing liquid.

A lid body 48 is attached to the case 43a and closes the opening. The lid body 48 includes the substantially cylindrical hose connecting portion 42 that projects in the longitudinal direction. A drawing passage 42a that draws washing liquid into the accommodation recess 43b of the case 43a is formed in the hose connecting portion 42. The drawing passage 42a opens at the middle of the inner side surface of the lid body 48.

As shown in FIG. 3, the distal portion of the hose 40 extending toward the passenger's seat side washer nozzle 41a is inserted into the cover 31 from an insertion hole 31e formed in the center cover 31 in the vicinity of the distal portion of the wiper arm 12a and fitted to the hose connecting portion 42 of the washer nozzle 41a in the cover 31.

In FIG. 7, an annular projection 48a having a diameter smaller than the outer diameter of the valve body 45 is formed around the opening of the drawing passage 42a at the inner side surface of the lid body 48. The seal 45b of the valve body 45 is closely attached to the annular projection 48a by the biasing force of the coil spring 46. That is, the drawing passage 42a is closed by the valve body 45 (valve close) to prevent washing liquid from entering the accommodation recess 43b. In contrast, when washing liquid is supplied through the hose 40 by the activation of the washer pump, the valve body 45 is retracted against the biasing force of the coil spring 46 by the supply pressure of washing liquid and opens the drawing passage 42a is opened (valve open). This supplies washing liquid into the accommodation recess 43b.

The nozzle portion 44 has a communication hole 44a that extends in the longitudinal direction. The communication hole 44a is in communication with the accommodation recess 43b in the case 43a. The lower surface of the nozzle portion 44 (lid portion 18g) includes four ejection holes, namely, a first ejection hole 51a, a second ejection hole 51b, a third ejection hole 51c, and a fourth ejection hole 51d that eject washing liquid and are arranged at a predetermined interval in the longitudinal direction of the washer nozzle 41a. Each of the ejection holes 51a to 51d is arranged linearly along the longitudinal direction of the wiper blade 13a (same direction as the longitudinal direction of the washer nozzle 41a). The ejection holes 51a to 51d are arranged in the order of the first ejection hole 51a, the second ejection hole 51b, the third ejection hole 51c, and the fourth ejection hole 51d from the distal side toward the basal side in the longitudinal direction of the wiper blade 13a.

The first ejection hole 51a is arranged near the distal portion of the nozzle portion 44, and the second ejection hole 51b is arranged substantially at the longitudinally middle part of the nozzle portion 44. The third ejection hole 51c is arranged at a position slightly closer to the basal side from the longitudinally middle part of the nozzle portion 44. The first to third ejection holes 51a to 51c are each in communication with the communication hole 44a. The first ejection hole 51a extends toward the basal side of the wiper blade 13a in the direction of the lower surface of the nozzle portion 44. The second and third ejection holes 51b and 51c extend toward the distal portion side of the wiper blade 13a in the direction of the lower surface of the nozzle portion 44. The second ejection hole 51b extends in the widthwise direction of the wiper blade 13a through the interior of one of the two partition walls 18f (farther partition wall 18f in FIG. 6) from the communication hole 44a and is formed at a position shifted in the width direction from the communication hole 44a.

The fourth ejection hole 51d is arranged at the lower part of the accommodation recess 43b in communication with the accommodation recess 43b and extends toward the basal side of the wiper blade 13a in the direction of the lower surface of the lid portion 18g. Each ejection hole 51a to 51d gradually spreads in the longitudinal direction of the washer nozzle 41a toward the lower surface of the nozzle portion 44 (towards the opening of the hole) to eject washing liquid in a diffused manner.

The operation of the above embodiment will be described below.

When the wiping surface Ga requires washing liquid and the washer pump is activated with each wiper 11a and 11b stopped at the stop position (lower reversing positions Da, Db) shown in FIG. 1, washing liquid is supplied to each washer nozzle 41a and 41b through the hose 40. In the driver's seat side washer nozzle 41b, the washing liquids W5 and W6 are ejected from the ejection hole at the distal portion 41c. In the passenger's seat side washer nozzle 41a, washing liquid is supplied to the accommodation recess 43b and the communication hole 44a in the nozzle 41a, and washing liquids W1, W2, W3, and W4 are ejected from the ejection holes 51a to 51d, respectively. The wiping operation from the stop position of each wiper 11a and 11b starts with a delay of a predetermined time from the activation of the washer pump. The wiper blades 13a and 13b pivot back and forth between upper reversing positions Ua and Ub, which serve as a second reversing positions, and lower reversing positions Da and Db, which serve as first reversing position, by the reciprocating pivoting operation of the wiper arms 12a and 12b, respectively. The wiping of each wiper blade 13a and 13b on the wiping surface Ga is carried out when the blade rubber 15 moves in a widthwise direction orthogonal to the longitudinal direction of the wiper blades 13a and 13b with the entire blade rubber 15 in the longitudinal direction following the wiping surface Ga. Each wiper 11a and 11b pivots back and forth in the same direction in synchronization.

[Ejection Mode of Washing Liquid of Passenger's Seat Side Washer Nozzle]

As shown in FIG. 7, the first ejection hole 51a of the passenger's seat side washer nozzle 41a ejects the washing liquid W1 toward the basal portion 13c of the wiper blade 13a (end in the longitudinal direction on the side close to the pivot shaft P1) in accordance with its shape. The second and third ejection holes 51b and 51c respectively eject the washing liquids W2 and W3 toward the distal portion 13d of the wiper blade 13a in accordance with their shapes. In the present embodiment, the ejecting direction of the second ejection hole 51b is set to the rear side in the advancing direction when the wiper blade 13a moves from the lower reversing position Da to the upper reversing position Ua, and the ejecting direction of the third ejection hole 51c is set to the front side in the advancing direction.

Figure 9:
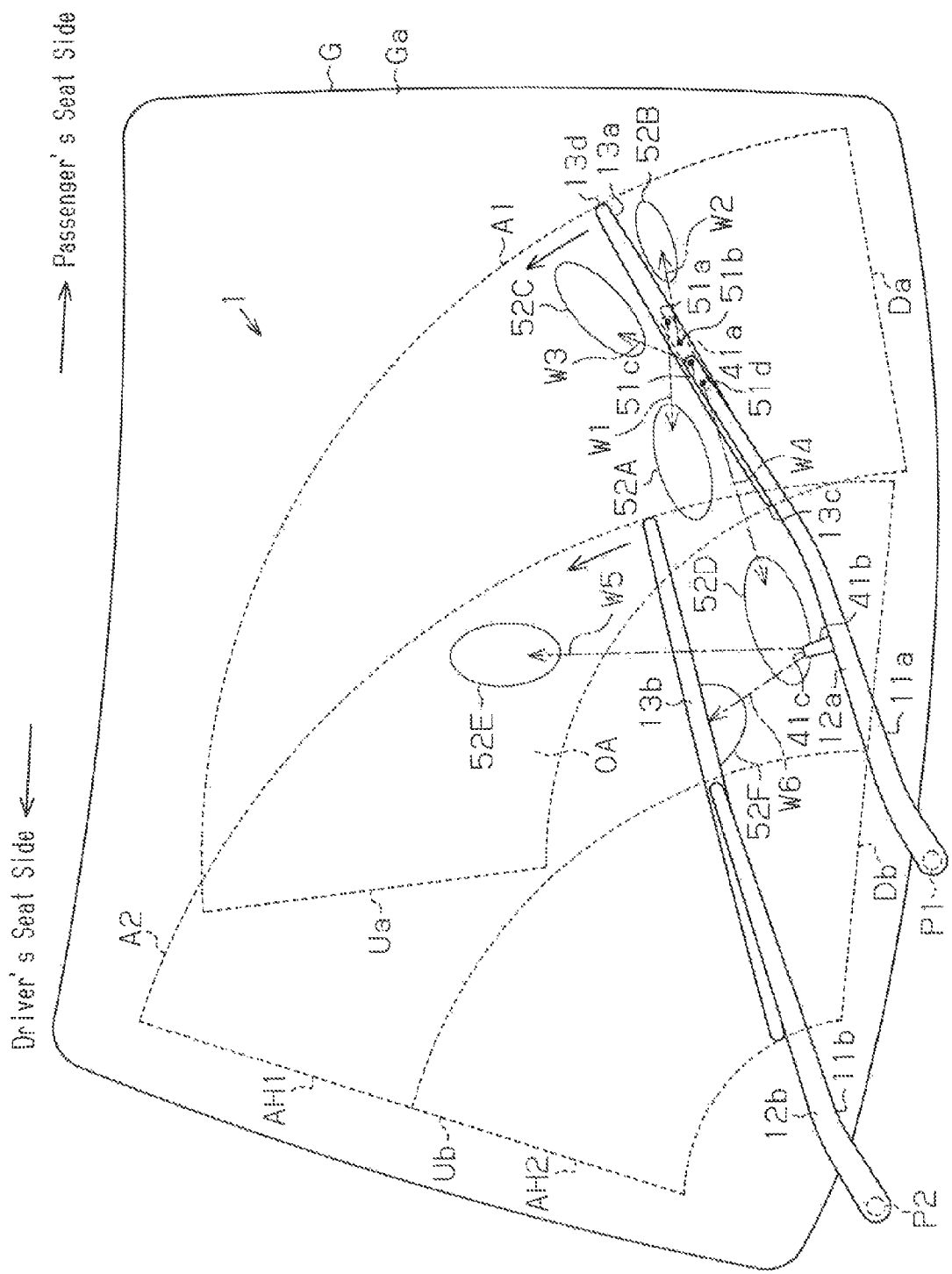
FIG. 9 is a schematic view showing a wiping mode using washing liquid of the vehicle wiper of FIG. 1.

FIG. 9 shows landing areas 52A, 52B, and 52C at where the washing liquid W1 to W3 ejected from the first to third ejection holes 51a to 51c land on the wiping surface Ga. The landing areas 52A to 52C are set within the first wiping area A1, which is the wiping area of the wiper blade 13a on the passenger's seat side. That is, the washing liquid W1 to W3 from the first to third ejection holes 51a to 51c are supplied to the first wiping area A1. A center axis L1 of the washing liquid W1 ejected from the first ejection hole 51a intersect with the center axes L2 and L3 of the washing liquid W2 and W3 ejected from the second and third ejection holes 51b and 51c as viewed from the widthwise direction (short side direction) of the wiper blade 13a.

The fourth ejection hole 51d ejects the washing liquid W4 toward the basal portion 13c of the wiper blade 13a in accordance with its shape. Washing liquid W4 from the fourth ejection hole 51d is ejected outward in the longitudinal direction from the basal portion 13c of the wiper blade 13a, and a landing area 52D of the washing liquid W4 is set within the second wiping area A2, which is the wiping area of the wiper blade 13b at the driver's seat side. Washing liquid W4 is thus also supplied to the second wiping area A2, which is the wiping area of the wiper blade 13b at the driver's seat side from the passenger's seat side washer nozzle 41a. Washing liquid W4 ejected from the fourth ejection hole 51d strikes the wiper blade 13b at an acute angle when the wiper blade 13b is at the lower reversing position Db. Washing liquid W4 is thus guided in the longitudinal direction along the wiper blade 13b and spreads in the longitudinal direction so that the washing liquid W4 is supplied toward the basal side of the wiper blade 13b.

[Ejection Mode of Washing Liquid of Driver's Seat Side Washer Nozzle]

The driver's seat side washer nozzle 41b ejects the washing liquid W5 and W6 based on the supply of washing liquid from the washer pump. As shown in FIG. 8, the ejected the washing liquid W5 and W6 pass above the wiper blade 13b so as to traverse the wiper blade 13b at the driver's seat side to be supplied to the wiping surface Ga when each wiper 11a and 11b is at the stop position (lower reversing position Da, Db). Incident angles θ1 and θ2 of the ejected washing liquid W5 and W6 relative to the wiping surface Ga are set to be greater than or equal to five degrees (θ1>θ2).

Figure 10:
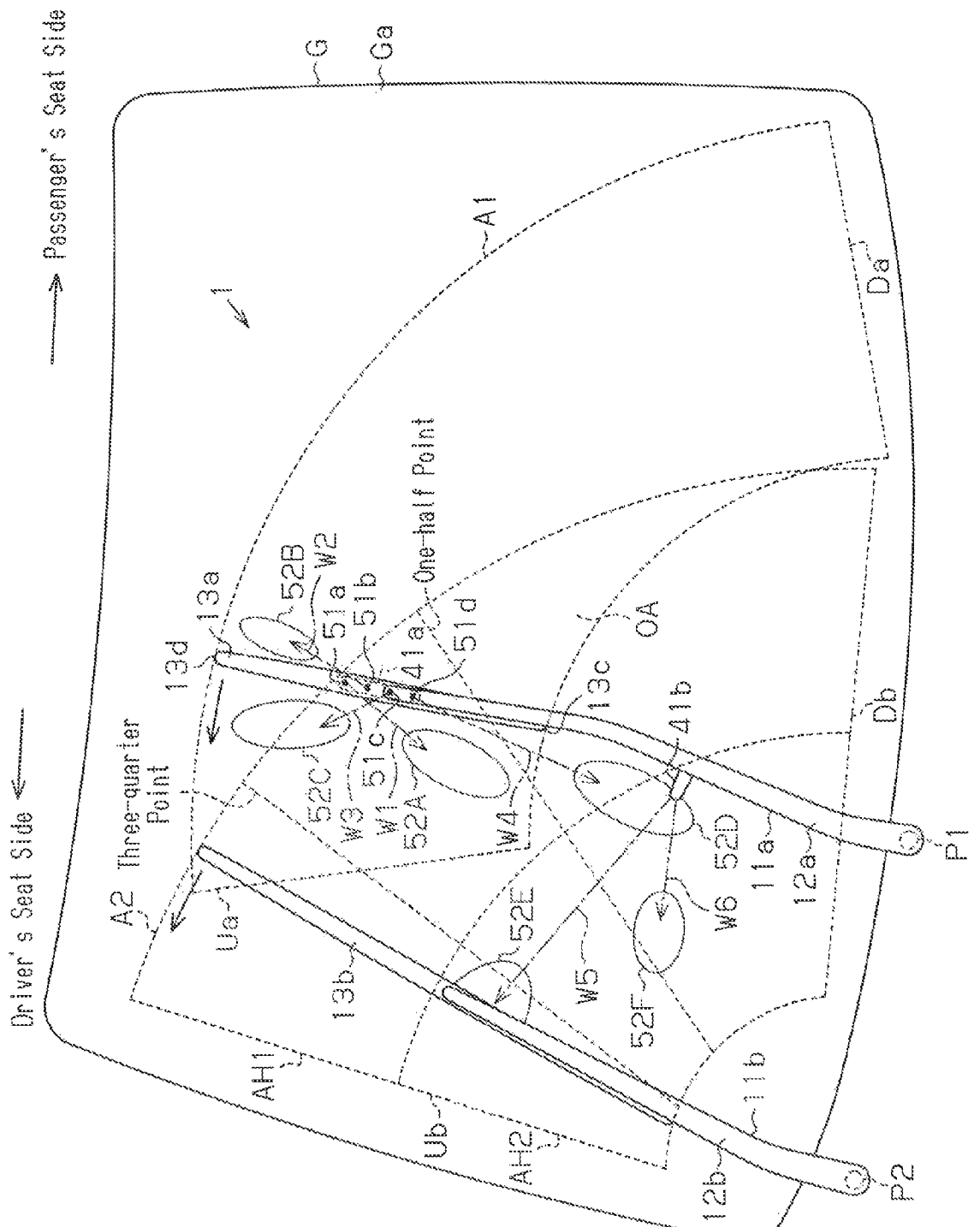
FIG. 10 is a schematic view showing a wiping mode using washing liquid of the vehicle wiper of FIG. 1.
Figure 11:
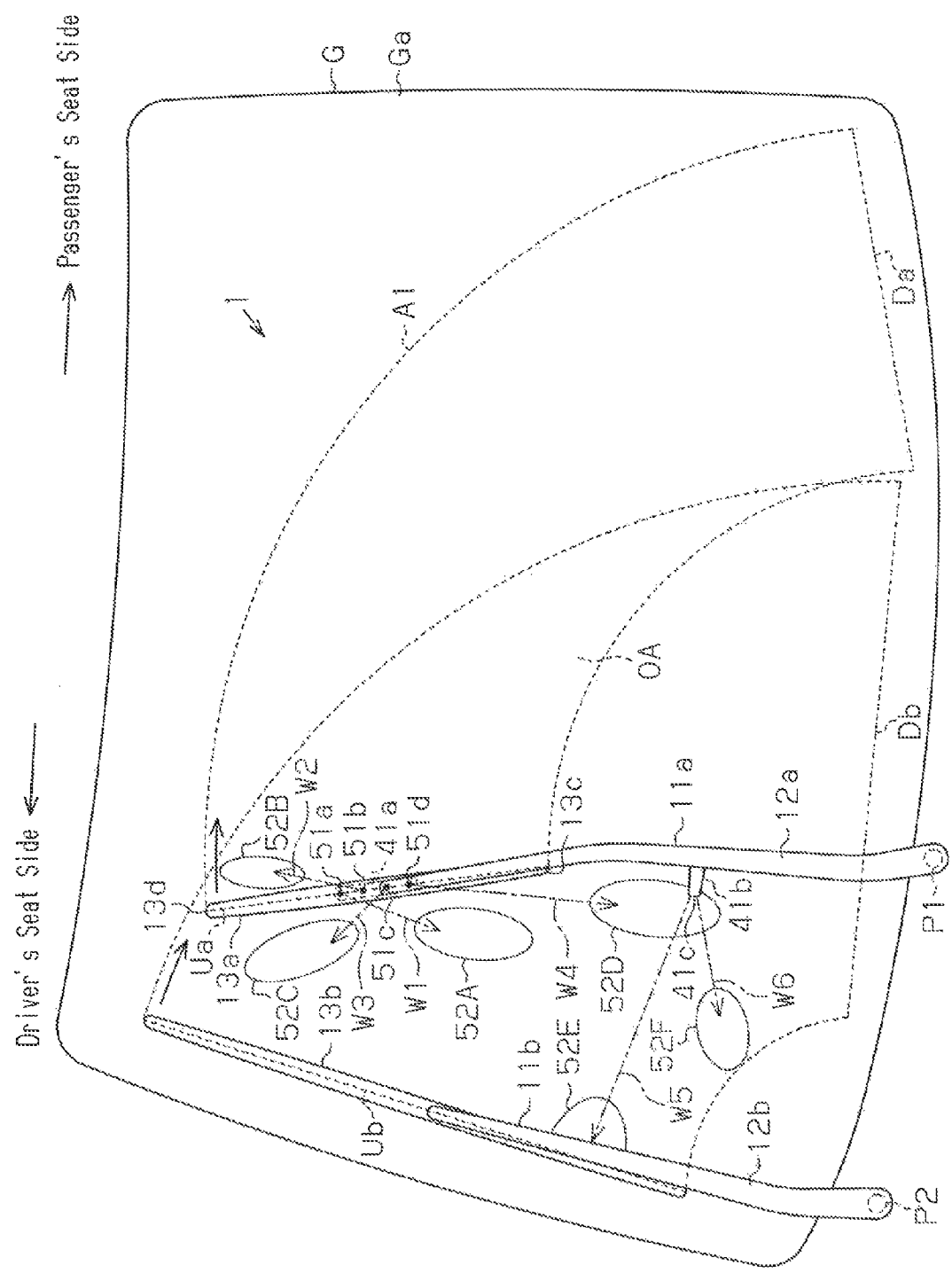
FIG. 11 is a schematic view showing a wiping mode using washing liquid of the vehicle wiper of FIG. 1.

FIGS. 9 to 11 show landing areas 52E and 52F where the washing liquid W5 and W6 ejected from the washer nozzle 41b land on the wiping surface Ga. FIG. 9 shows the wiping areas A1 and A2 wiped by the wiper blades 13a and 13b. As shown in FIG. 9, the window glass G includes an overlap region OA (region wiped by both the wiper blade 13a on the passenger's seat side and the wiper blade 13b on the driver's seat side) that overlaps a distal area AH1 of the second wiping area A2 at the driver's seat side on the upper reversing position Ua side of the first wiping area A1 on the passenger's seat side. The wiping areas A1 and A2 are set such that the overlap region OA gradually becomes wider width (increases) toward the upper reversing position Ua side of the first wiping area A1 at the passenger's seat side.

FIG. 9 also shows a state in which the wiper blades 13a and 13b are moved by about one quarter from the lower reversing positions Da and Db (stop positions) toward the upper reversing positions Ua and Ub. Here, the washing liquids W5 and W6 ejected from the washer nozzle 41b are supplied to the distal area AH1, which is the area wiped by the part of the wiper blade 13b distal from the longitudinally middle part at the driver's seat side in the second wiping area A2. Furthermore, the washing liquid W5 is supplied toward the front side in the advancing direction (upper reversing position Ub side) of the wiper blade 13b at the driver's seat side. Here, the washing liquid W5 is also simultaneously supplied to the first wiping area A1 at the passenger's seat side.

The other washing liquid W6 ejected from the washer nozzle 41b is supplied toward the front side in the advancing direction of the wiper blade 13b at the driver's seat side when the wiper blades 13a and 13b are at the lower reversing positions Da and Db. However, the washing liquid W6 is supplied toward the rear side in the advancing direction (lower reversing position Db side) of the wiper blade 13b at the driver's seat side when each wiper blade 13a and 13b is at a one quarter point as shown in FIG. 9. In other words, the supply of the washing liquid W6 switches from the supply toward the front side in the advancing direction to the supply toward the rear side in the advancing direction of the wiper blade 13b at the driver's seat side near the one quarter point of each of the wiper blades 13a and 13b.

FIG. 10 shows a state in which the wiper blades 13a and 13b are further moved to the upper reversing positions Ua and Ub from the state shown in FIG. 9 and are moved by three-quarter or greater toward the upper reversing positions Ua and Ub from the lower reversing positions Da and Db. In this case, the washing liquid W5 ejected from the washer nozzle 41b is supplied toward the rear side in the advancing direction (side of the lower reversing position Db) of the wiper blade 13b at the driver's seat side. In other words, while the wiper blade 13b at the driver's seat side moves from the lower reversing position Db to the upper reversing position Ub, the supply of the washing liquid W5 from the washer nozzle 41b switches from the supply toward the front side in the advancing direction to the supply toward the rear side in the advancing direction of the wiper blade 13b.

In this manner, in the present embodiment, the supply of the washing liquids W5 and W6 ejected from the washer nozzle 41b switches from the supply toward the front side in the advancing direction to the supply toward the rear side in the advancing direction of the wiper blade 13b as the wiper blade 13b on the driver's seat side moves from the lower reversing position Db to the upper reversing position Ub. Therefore, the washing liquid W5 and W6 can be suitably supplied toward the advancing direction side of the wiper blade 13b during an open operation in which the wiper blade 13b moves from the lower reversing position Db to the upper reversing position Ub shown in FIGS. 9 and 10 and during a close operation (movement from the upper reversing position Ub to the lower reversing position Db) shown in FIG. 11.

Further, in the present embodiment, the switching of the washing liquid W5 from the front side to the rear side in the advancing direction is carried out when the wiper blade 13b moving toward the upper reversing position Ub is located toward the upper reversing position Ub from the halfway point. Thus, the time from when the supply of the washing liquid W5 switches from the front side to the rear side in the advancing direction when the wiper blade 13b is moving toward the upper reversing position Ub until when the wiper blade 13b reaches the upper reversing position Ub is relatively short.

In contrast with the present embodiment, a case when the switching of the supply of the washing liquid W5 from the front side to the rear side in the advancing direction is carried out as the wiper blade 13b moves to the upper reversing position Ub positioned toward the lower reversing position Db from the halfway point will now be discussed. In such a case, the supply of the washing liquid W5 switches from the front side to the rear side in the advancing direction at an early stage from when the wiper blade 13b moves from the lower reversing position Db to the upper reversing position Ub. Thus, the washing liquid at the front side in the advancing direction of the wiper blade 13b tends to become insufficient. Since the time until the washing liquid W5 supplied toward the rear side in the advancing direction of the wiper blade 13b is wiped by the wiper blade 13b reversed at the upper reversing position Ub is relatively long, the influence on the driver's field of view in front of the driver's seat resulting from the washing liquid W5 supplied toward the rear side in the advancing direction of the wiper blade 13b may become relatively large.

In this regard, like in the present embodiment, the washing liquid can be prevented from becoming insufficient in the advancing direction of the wiper blade 13b by setting the position for switching the supply of the washing liquid W5 from the front side to the rear side in the advancing direction toward the upper reversing position Ub from the halfway point. Furthermore, since the time is short until the washing liquid W5 supplied toward the rear side in the advancing direction of the wiper blade 13b is wiped by the wiper blade 13b reversed at the upper reversing position U, the influence of the washing liquid W5 remaining at the rear side in the advancing direction of the wiper blade 13b on the driver's field of view in front of the driver's seat can be minimized.

Furthermore, as shown in FIG. 10, the washing liquid in the advancing direction side of the wiper blade 13b can be further prevented from becoming insufficient by switching the supply of the washing liquid W5 from the front side to the rear side in the advancing direction when the wiper blade 13b moving toward the upper reversing position Ub is located toward the upper reversing position Ub from the three-quarter point. Furthermore, the time until the washing liquid W5 supplied toward the rear side in the advancing direction of the wiper blade 13b is wiped by the wiper blade 13b reversed at the upper reversing position Ub is shortened. This further decreases the influence of the washing liquid W5 remaining on the rear side in the advancing direction of the wiper blade 13b on the driver's field of view in front of the driver's seat. That is, a structure in which the supply of the washing liquid W5 switches from the front side to the rear side in the advancing direction when the wiper blade 13b moving toward the upper reversing position Ub is located toward the upper reversing position Ub from the three-quarter point is more preferable.

At the position of the wiper blade 13b shown in FIG. 10, the washing liquids W5 and W6 ejected from the washer nozzle 41 are supplied to the basal area AH2, which is an area wiped by the basal part of the longitudinally middle part of the wiper blade 13b, of the second wiping area A2 at the driver's seat side. In other words, since the washer nozzle 41b also moves with the wiper 11a (wiper arm 12a) at the passenger's seat side while the wiper blade 13b at the driver's seat side moves from the lower reversing position Db to the upper reversing position Ub, the supply of the washing liquid W5 and W6 from the washer nozzle 41b switches from the supply to the distal area AH1 to the supply to the basal area AH2. Washing liquid W5 and W6 from the washer nozzle 41b are thus supplied to both the distal area AH1 and the basal area AH2 of the second wiping area A2 during the movement of the wiper blade 13b so that washing liquid can be supplied from the washer nozzle 41b over a wide range of the second wiping area A2. In addition, the washing liquids W5 and W6 from the washer nozzle 41b that were supplied to the distal area AH1 in the vicinity of the lower reversing position Db changes to the basal area AH2 in the vicinity of the upper reversing position Ub. This prevents the washing liquids W5 and W6 from landing an the driver's eye point during the wiping operation of each wiper 11a and 11b.

As shown in FIG. 11, the washing liquid W5 is shielded when striking the end face of the wiper blade 13b at the side of lower reversing position Db (advancing direction side) in a state in which the wiper blade 13b is at the upper reversing position Ub. This suppresses the so-called spray-out, in which washing liquid is scattered out of the second wiping area A2 beyond the wiper blade 13b.

In the present embodiment, the washing liquid W4 ejected from the passenger's seat side washer nozzle 41a is supplied to the second wiping area A2 at the driver's seat side. The supply of the washing liquid W4 also switches from the supply toward the front side in the advancing direction to the supply toward the rear side in the advancing direction of the wiper blade 13b while the wiper blade 13b on the driver's seat side moves from the lower reversing position Db to the upper reversing position Ub. Furthermore, washing liquid supplied to the distal area AH1 in the vicinity of the lower reversing position Db is supplied to the basal area AH2 in the vicinity of the upper reversing position Ub. This prevents the washing liquid W4 from landing at the driver's eye point during the wiping operation of the wiper. Furthermore, the landing shape of the washing liquid W4 also changes from a shape spread in the widthwise direction of the vehicle (window) to a shape spread in the front and rear direction of the vehicle (longitudinal direction of the window) as the wiper 11a (wiper blade 13a) moves at the passenger's seat side from the lower reversing position Db to the upper reversing position Ub. This further suppresses interferences in the driver's field of view.

In the same manner as the driver's seat side washer nozzle 41b, the washing liquid W4 ejected from the passenger's seat side washer nozzle 41a can also be supplied in a preferable manner at the advancing direction side of the wiper blade 13b during either one of the open operation and the close operation of the wiper blade 13b.

In the present embodiment, the wiping areas A1 and A2 wiped by the wiper blades 13a and 13b include an overlap region OA in which the side of the upper reversing position Ua of the first wiping area A1 at the passenger's seat side overlaps the second wiping area A2 (distal area AH1) at the driver's seat side side. More specifically, the upper reversing position Ua of the first wiping area A1 at the passenger's seat side is at least partially (entirely in the present embodiment) included in the overlap region OA. Thus, even if the raindrops and the washing liquids W1 and W3 wiped and collected by the wiper blade 13a at the passenger's seat side, which moves toward the upper reversing position Ua, temporarily remain at the upper reversing position Ua when the wiper blade 13a is reversed, the remaining raindrops and the washing liquid W1 and W3 are immediately wiped by the reversed wiper blade 13b at the driver's seat side. This readily ensures the driver's field of view.

As described above, in the vehicle wiper apparatus 1 of the present embodiment, the washing liquid W1 to W6 is supplied to the first and second wiping areas A1 and A2 of the wiping surface Ga in a preferable manner with little waste from the two washer nozzles 41a and 41b arranged on the passenger's seat side wiper 11a.

The present embodiment has the advantages described below.

(1) The supply of the washing liquid W5 and W6 from the washer nozzle 41b arranged at the passenger's seat side wiper 11a switches from the supply toward the front side in the advancing direction to the supply toward the rear side in the advancing direction of the wiper blade 13b while the wiper blade 13b at the driver's seat side moves from the lower reversing position Db to the upper reversing position Ub. That is, the washing liquid W5 and W6 are supplied in a preferable manner toward the advancing direction of the wiper blade 13b at the driver's seat side during both of the open operation from the lower reversing position Db to the upper reversing position Ub and the opposite close operation. Accordingly, the number of coupling steps of the washer nozzle and the hose to the driver's seat side wiper 11b is reduced and the manufacturing is facilitated by arranging the washer nozzles 41a and 41b only on the passenger's seat side wiper 11a. Furthermore, the washing liquids W5 and W6 are effectively supplied to the wiping surface Ga during the operation of each wiper 11a and 11b with an inexpensive structure that does not require a circuit for complicated spray control.

(2) At a location toward the upper reversing position Ub from the halfway point between the lower reversing position Fb and the upper reversing position Ub of the wiper blade 13b at the driver's seat side, the supply of the washing liquid W5 from the washer nozzle 41b switches from the supply toward the front side in the advancing direction to the supply toward the rear side in the advancing direction of the wiper blade 13b, which moves toward the upper reversing position Ub. Thus, the time from when the supply of the washing liquid W5 switches from toward the front side in the advancing direction to toward the rear side in the advancing direction of the wiper blade 13b, which moves toward the upper reversing position Ub, until when the wiper blade 13b reaches the upper reversing position Ub is relatively short. Thus, the shortage of washing liquid in the advancing direction of the wiper blade 13b is suppressed. This reduces the time until the washing liquid W5 supplied toward the rear side in the advancing direction of the wiper blade 13b is wiped by the wiper blade 13b reversed at the upper reversing position Ub. This minimizes the influence of the washing liquid W5 remaining on the rear side in the advancing direction of the wiper blade 13b on the driver's field of view in front of the driver's seat.

In the present embodiment, at a location toward the upper reversing position Ub from the three-quarter point between the lower reversing position Db and the upper reversing position Ub of the wiper blade 13b at the driver's seat side, the supply of the washing liquid W5 from the washer nozzle 41b switches, when moving toward the upper reversing position Ub, from the supply toward the front side in the advancing direction to the supply toward the rear side in the advancing direction of the wiper blade 13b at the driver's seat side. This prevents the washing liquid in the advancing direction of the wiper blade 13b from being insufficient and further decreases interference of the driver's field of view in front of the driver's seat by the washing liquid W5 remaining on the rear side in the advancing direction of the wiper blade 13b.

(3) While the wiper blade 13b on the driver's seat side moves from the lower reversing position Db to the upper reversing position Ub, the supply of the washing liquid W5 and W6 from the washer nozzle 41b switches from the supply to the distal area AH1 to the supply to the basal area AH2. Washing liquids W5 and W6 from the washer nozzle 41b arranged at the passenger's seat side wiper 11a are thus supplied to both the distal area AH1 and the basal area AH2 of the second wiping area A2. Thus, the washing liquids W5 and W6 are supplied over a wide range of the second wiping area A2 at the driver's seat side (over the longitudinal direction of the wiper blade 13b on the driver's seat side) from the washer nozzle 41b.

Furthermore, the washing liquids W5 and W6 from the washer nozzle 41b supplied to the distal area AH1 in the vicinity of the lower reversing position Db is then supplied to the basal area AH2 in the vicinity of the upper reversing position Ub. This avoids the washing liquids W5 and W6 from landing at the driver's eye point during the wiping operation of the wiper.

(4) The driver's seat side washer nozzle 41b is arranged on the wiper arm 12a of the passenger's seat side wiper 11a. Thus, the supply of the washing liquid W5 from the washer nozzle 41b switches in a preferable manner from the supply toward the front side in the advancing direction to the supply toward the rear side in the advancing direction of the wiper blade 13b as the wiper blade 13b at the driver's seat side moves from the lower reversing position Db to the upper reversing position Ub.

(5) The driver's seat side washer nozzle 41b also supplies the washing liquid W5 to the first wiping area A1 at the passenger's seat side. Thus, the washing liquid W5 from the washer nozzle 41b arranged at the passenger's seat side wiper 11a is supplied not only to the second wiping area A2 on the driver's seat side but also to the first wiping area A1 on the passenger's seat side. This effectively supplies the washing liquid W5.

(6) At the passenger's seat side wiper 11a, the passenger's seat side washer nozzle 41a for supplying the washing liquid W1 to W3 to the first wiping area A1 on the passenger's seat side is arranged separately from the washer nozzle 41b at the driver's seat side. Thus, washing liquid is more effectively supplied to the wiping surface Ga.

(7) Since the driver's seat side washer nozzle 41b is arranged on the side wall 20a of the wiper arm 12a at the passenger's seat side, the washer nozzle 41b is prevented from interfering with the driver's field of view in front of the driver's seat. In cold regions, the washer nozzle 41b is prevented from hitting frozen snow and the like at the lower end of the window glass G and being damaged during a wiping operation.

The embodiment of the present invention may be modified as described below.

In the embodiment described above, the washer nozzle 41b is configured as a separate body from the Y-joint 40a. However, the washer nozzle 41b may be formed as a nozzle integrated with the joint.

The number of first to fourth ejection holes 51a to 51d of the passenger's seat side washer nozzle 41a and the number of ejection holes of the driver's seat side washer nozzle 41b of the embodiment described above may be increased or decreased in accordance with the structure.

In the embodiment described above, the driver's seat side washer nozzle 41b is formed by a single nozzle unit including two ejection holes but may be formed by connecting a plurality of nozzles.

In the embodiment described above, the driver's seat side washer nozzle 41b is a jet nozzle capable of ejecting the washing liquid W5 and W6 as an ejection flow having directivity. Instead, the washer nozzle 41b may be a diffusion nozzle that self-oscillates and ejects washing liquid as a diffusion flow that diffuses in a predetermined direction, for example.

In the embodiment described above, the driver's seat side washer nozzle 41b has a structure of supplying the washing liquid W5 also to the first wiping area A1 on the passenger's seat side, but is not particularly limited, and may have a structure in which the washing liquid W5 from the washer nozzle 41b is not supplied to the first wiping area A1, for example.

In the embodiment described above, the point of switching the supply of the washing liquid W5 from the front side to the rear side in the advancing direction of the wiper blade 13b is set to the upper reversing position Ub side than the three-quarter point between the lower reversing position Db and the upper reversing position Ub, but is not particularly limited thereto, and the switching point may be changed according to the structure. The switching point of supply from the front side to the rear side in the advancing direction of the wiper blade 13b of the washing liquid W6 may also be changed.

In the embodiment described above, the supply of the washing liquid W5 and W6 from the washer nozzle 41b switches from the supply to the distal area AH1 to the supply to the basal area AH2 while the wiper blade 13b on the driver's seat side moves from the lower reversing position Db to the upper reversing position Ub, but is not particularly limited thereto, and only the supply of the washing liquid W5 of the washing liquid W5 and W6 may be switched from the distal area AH1 to the basal area AH2, and the washing liquid W6 may be supplied to the basal area on a constant basis, for example.

In the embodiment described above, the driver's seat side washer nozzle 41b is arranged on the side wall 20a of the wiper arm 12a of the passenger's seat side wiper 11a, but is not particularly limited thereto, and the attachment position of the washer nozzle 41b may be appropriately changed according to the structure. For example, the washer nozzle 41b may be arranged on the upper wall 20b of the wiper arm 12a on the passenger's seat side. According to such structure, the washer nozzle 41b can be arranged at a position further away from the wiping surface Ga, and thus the degree of freedom in setting of the supply mode of washing liquid with respect to the wiping surface Ga of the washer nozzle 41b can be enhanced. Other than this, the washer nozzle 41b may be arranged on the wiper blade 13a on the passenger's seat side, for example.

In the embodiment described above, in a state each wiper 11a and 11b is at the stop position, the distal portion 41c of the driver's seat side washer nozzle 41b is configured to overlap in a direction orthogonal to the wiping surface Ga with the portion of the wiper blade 13b on the distal portion side than the longitudinally middle part of the wiper blade 13b on the driver's seat side, but is not particularly limited thereto. For example, the projecting amount of the washer nozzle 41b may be made smaller than in the embodiment described above, so that the distal portion 41c of the washer nozzle 41b does not overlap with the wiper blade 13b in the direction orthogonal to the wiping surface Ga. Furthermore, for example, the attachment position of the washer nozzle 41b may be set on the distal portion side of the wiper arm 12b than the attachment position in the embodiment described above, so that the distal portion 41c of the washer nozzle 41b does not overlap with the wiper blade 13b in the direction orthogonal to the wiping surface Ga.

In the embodiment described above, the passenger's seat side washer nozzle 41a is arranged on the passenger's seat side wiper 11a apart from the driver's seat side washer nozzle 41b, but is not particularly limited thereto, and the washer nozzle arranged on the passenger's seat side wiper 11a may be only the washer nozzle 41b, for example. According to such structure, the number of washer nozzles arranged on the vehicle wiper apparatus 1 can be further reduced, so that the manufacturing can be facilitated and the number of components can be suppressed small. In the case of such structure, washing liquid can be more suitably supplied even to the first wiping area A1 on the passenger's seat side by adding, to the washer nozzle 41b of the embodiment described above, a ejection hole for ejecting washing liquid to the outer side in the longitudinal direction than the distal portion of the wiper blade 13b on the driver's seat side.

In the embodiment described above, the passenger's seat side washer nozzle 41a is configured as one nozzle unit including the check valve portion 43 and the first to fourth ejection holes 51a to 51d, but may be configured by connecting a plurality of nozzles.

For example, the passenger's seat side spray nozzle for supplying washing liquid to the first wiping area A1 and the driver's seat side spray nozzle for supplying washing liquid to the second wiping area A2 may be individually arranged.

The nozzle for ejecting to the first wiping area A1 on the passenger's seat side may be a diffusion nozzle capable of self-oscillating washing liquid and ejecting as the diffusion flow that diffuses in a predetermined direction. According to such structure, for example, washing liquid can be more effectively supplied over a wide range along the longitudinal direction of the wiper blade 13a by having the diffusion direction of the diffusion nozzle as the direction along the longitudinal direction of the wiper blade 13a.

The nozzle for ejecting to the second wiping area A2 on the driver's seat side may be a jet nozzle capable of ejecting washing liquid as a concentrated spray flow having directivity toward the second wiping area A2. According to such structure, for example, washing liquid can be stably supplied to the second wiping area A2 even if the washer nozzle arranged on the wiper blade 13a and the second wiping area A2 are spaced apart. Furthermore, when the ejecting direction is set such that the washing liquid W4 ejected toward the second wiping area A2 enters at an acute angle with respect to the longitudinal axis line of the wiper blade 13b at the stop position, the jet nozzle is adopted as the nozzle for ejecting toward the second wiping area A2 so that the washing liquid W4 can be guided along the wiper blade 13b and more reliably spread in the longitudinal direction of the wiper blade.

In the embodiment described above, the check valve portion 43 is arranged on the passenger's seat side washer nozzle 41a, but the check valve portion 43 may be omitted.

In the embodiment described above, the passenger's seat side washer nozzle 41a is arranged in the cover member 16, but may be arranged exterior to the cover member 16.

The invention claimed is:

1. A vehicle wiper apparatus applied to a vehicle provided with a wiping surface including a first wiping area at a passenger's seat side and a second wiping area at a driver's seat side, the vehicle wiper apparatus comprising:
   a first wiper including a first wiper arm, which is configured to pivot back and forth, and a first wiper blade, which is coupled to a distal portion of the first wiper arm and configured to wipe the first wiping area;
   a second wiper including a second wiper arm, which is configured to pivot back and forth, and a second wiper blade, which is coupled to a distal portion of the second wiper arm and configured to move back and forth between a first reversing position and a second reversing position to wipe the second wiping area, the second wiper not including a washer nozzle; and
   a washer nozzle arranged on the first wiper to supply washing liquid to the second wiping area,
   wherein the washer nozzle is configured to spray washing liquid so that the supply of washing liquid toward a front side in an advancing direction of the second wiper blade switches to a rear side in the advancing direction when the second wiper blade moves from the first reversing position to the second reversing position during the wiping operation of the first and second wipers.

2. The vehicle wiper apparatus according to claim 1, wherein the supply of washing liquid toward the front side in the advancing direction of the second wiper blade switches to the supply toward the rear side in the advancing direction when the second wiper blade is moving toward the second reversing position and located at a position toward the second reversing position from a halfway point between the first reversing position and the second reversing position.

3. The vehicle wiper apparatus according to claim 1, wherein:
   the second wiper blade includes a distal part, which is located toward a distal side from a longitudinally middle part, and a basal part, which is located toward a basal side from the longitudinally middle part;
   the second wiping area includes a distal area, which is wiped by the distal part, and a basal area, which is wiped by the basal part; and
   the supply of washing liquid from the washer nozzle switches from the supply toward the distal area to the supply toward the basal area when the second wiper blade moves from the first reversing position to the second reversing position.

4. The vehicle wiper apparatus according to claim 1, wherein the supply of washing liquid toward the front side in the advancing direction of the second wiper blade switches to the supply toward the rear side in the advancing direction when the second wiper blade is moving toward the second reversing position and located at a position toward the second reversing position from a three-quarter point between the first reversing position and the second reversing position.

5. The vehicle wiper apparatus according to claim 1, wherein the washer nozzle is arranged on the first wiper arm.

6. The vehicle wiper apparatus according to claim 5, wherein when the washer nozzle is supplying washing liquid toward the front side in the advancing direction of the second wiper blade, washing liquid from the washer nozzle passes above the second wiper blade to traverse the second wiper blade.

7. The vehicle wiper apparatus according to claim 1, wherein the washer nozzle is configured to supply washing liquid also to the first wiping area.

8. The vehicle wiper apparatus according to claim 7, wherein
   the wiping surface includes an overlap region in which the first wiping area and the second wiping area overlap with each other, and
   the washer nozzle is configured to supply washing liquid to the overlap region.

9. The vehicle wiper apparatus according to claim 1, wherein
   the washer nozzle is a driver's seat side washer nozzle; and
   the first wiper includes a passenger's seat side washer nozzle that supplies washing liquid to the first wiping area and arranged separated from the driver's seat side washer nozzle.

10. The vehicle wiper apparatus according to claim 9, wherein the passenger's seat side washer nozzle includes a plurality of ejection holes including a ejection hole that supplies washing liquid to the first wiping area and a ejection hole that supplies washing liquid to the second wiping area.

* * * * *